(12) United States Patent
Savard

(10) Patent No.: US 6,502,864 B1
(45) Date of Patent: Jan. 7, 2003

(54) UNIVERSAL CONDUIT CONNECTOR

(75) Inventor: Robert D. Savard, Pasadena, CA (US)

(73) Assignee: Donald E. Savard Co., San Gabriel, CA (US)

( * ) Notice: Subject to any disclaimer, the term of this patent is extended or adjusted under 35 U.S.C. 154(b) by 0 days.

(21) Appl. No.: 09/921,528

(22) Filed: Aug. 3, 2001

(51) Int. Cl.$^7$ ................................................ F16L 25/00
(52) U.S. Cl. ...................... 285/12; 285/256; 285/259; 285/334.1
(58) Field of Search ................................ 285/256, 259, 285/12

(56) References Cited

U.S. PATENT DOCUMENTS

| | | | | |
|---|---|---|---|---|
| 2,848,254 A | * | 8/1958 | Millar | 285/22.5 |
| 4,589,688 A | | 5/1986 | Johnson | 285/12 |
| 5,364,135 A | * | 11/1994 | Anderson | 285/38 |
| 5,375,887 A | | 12/1994 | Johnson | 285/12 |
| 5,516,155 A | * | 5/1996 | Ko | 285/12 |
| 6,059,261 A | | 5/2000 | Han | 251/148 |

* cited by examiner

*Primary Examiner*—Lynne H. Browne
*Assistant Examiner*—Giovanna Collins
(74) *Attorney, Agent, or Firm*—Christie, Parker & Hale, LLP

(57) ABSTRACT

A universal conduit connector. The universal conduit connector has a flexible conduit with an intermediate portion of a predetermined length with identical connector ends affixed to ends of the flexible conduit. Each connector end has a stem extending therefrom and has a through hole formed therethrough. The stems have intermediate portions with a smaller diameter and a beveled barb on a tip of the stem with a larger diameter. A plurality of threaded nut cups are provided, each having an aperture formed therein that is sized larger than the diameter of the barb tip. A plurality of resilient washers dimensioned to fit within a matched threaded nut cup and having a through hole sized to fit tightly around the intermediate portion of the stem are provided. The resilient washers are adapted to be engaged with the engagement means to retain the threaded nut cup with the connector ends.

11 Claims, 10 Drawing Sheets

UNIVERSAL CONDUIT CONNECTOR

BACKGROUND OF THE INVENTION

The invention relates to conduit connectors, and more particularly to universal conduit connectors which permit a single sized hose to be connected to a plurality of different sized pipe cup nuts and washers to provide for universal connectability, where the hose is preferably flexible.

In the residential and commercial fields, there are many applications for flexible hose with connectors at two ends utilized to connect, for example, a water pipe to a faucet, toilet, water purifier, etc. where the distance between the water pipe and the device being connected to varies, and where the fittings for the water pipe and the water or fluid connected device can widely vary. As a result, traditional flexible connector hoses must be provided in a variety of lengths and with a variety of different connectors at their ends. For retailers and large users of such flexible hoses (e.g., plumbers), this poses a problem because there needs to be a relatively large number of different lengths and hoses with a variety of different connectors on their two ends maintained in stock. The large number of permutations of lengths and combinations of connector ends is problematic for home users because they must find hoses not only with the correct length but also must determine which is the appropriate connector end taking into consideration the pipe diameter and thread style including course thread, fine thread, compression fitting and the like.

Prior attempts to solve this problem have included providing flexible hoses with large diameter connectors having a predetermined thread design and having screw-in adapters that are screwed to the connector ends which are adapted to fit onto the desired water pipe or water utilizing device connector. These adapters, however, create more interface areas between the connector and the water and water utilizing device, and therefore create the potential for additional areas of leakage.

There accordingly remains a need for a universal conduit connector.

SUMMARY OF THE INVENTION

The universal conduit connector of the invention addresses shortcomings of prior art conduit connectors by providing hoses with intermediate flex lines and universal connectors at least one end, the connectors having a stem with a barbed tip, a nut sized to be slipped over the barbed tip stem, and a sealing washer. By providing nuts and matching sealing washers in a variety of thread sizes and shapes, it is possible to use the universal connector to connect together any number of pipes and pipe nipples (e.g. a water pipe and a toilet, sink, ice maker, and the like).

These and other objects of the invention are met by providing retailers with a range of lengths of the hoses, and sets of nuts and washers, thereby permitting consumers and other users to choose the correct length hose and select from a relatively small number of required nuts and washers (e.g. ⅜" compression, ½" compression and ½" IP).

DETAILED DESCRIPTION OF THE INVENTION

Figure 1:
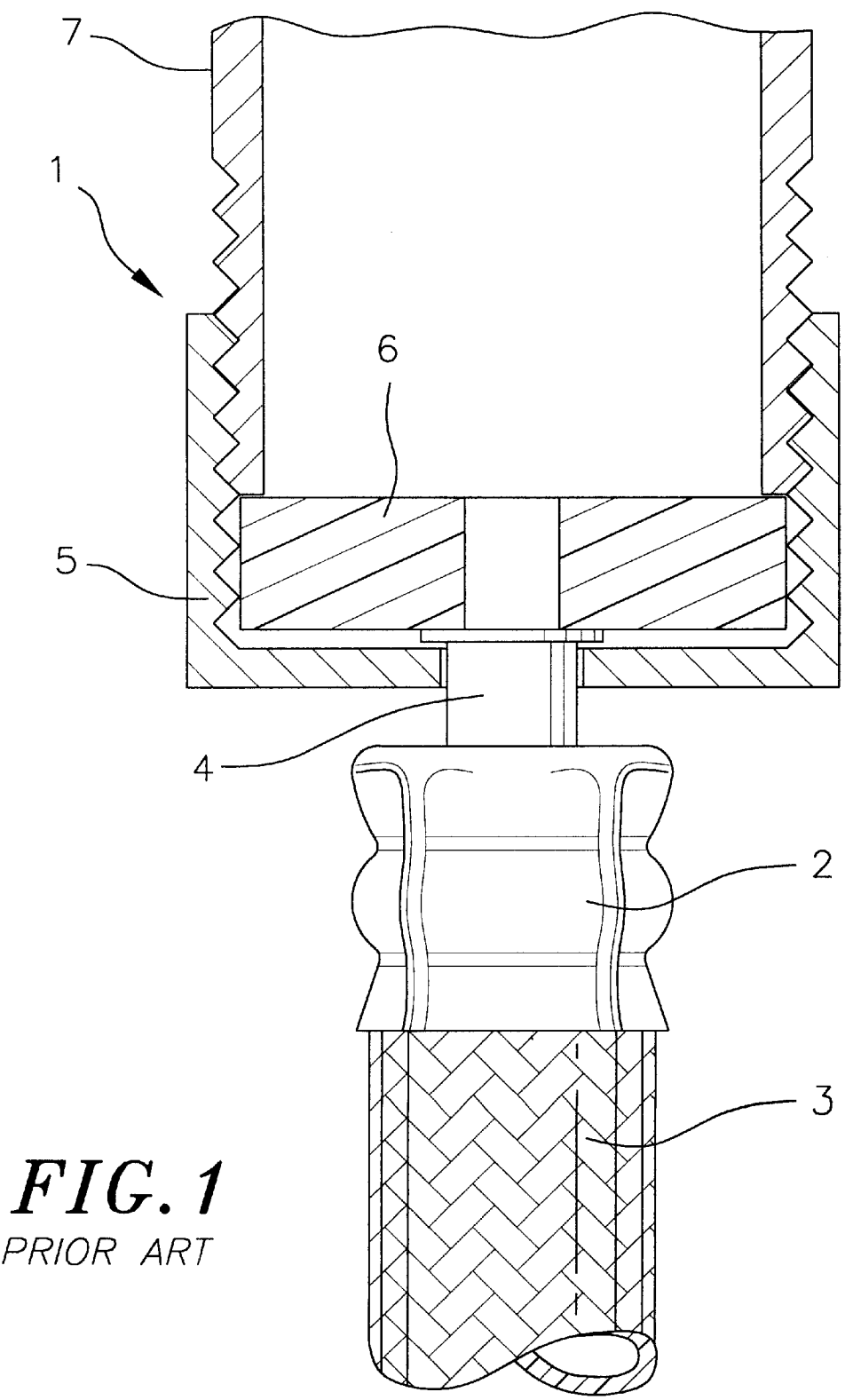
FIG. 1 is a cross-sectional view showing a connector end of a prior art flex hose assembly.

Turning first to FIG. 1, there is shown a partial cross-sectional view of a connector end of a prior art flex line connector 1 which has a connector 2 which is affixed to a hose 3. Extending from the end of a connector end 2 is a stem 4. Stem 4 provides for rotational connection to a cup nut 5. A washer 6 is placed within nut 5. When the nut is tightened on to a pipe nipple 7, washer 6 sealingly contacts with nut 5 and stem 4 to provide a leak-free connection. There are a large number of permutations given the various lengths of the flex lines, and the different connectors at both ends, for example, ½" compression at both ends, ½" compression at one end and a ⅜" compression at the other end, ½" compression at one end and ½" IP (iron pipe) at the end, ⅜" compression at both ends, ⅜" compression at one end and ½" IP at the other end, and ½" IP at both ends, as well as combinations with ⅞" ballcock, ⁷⁄₁₆" compression, ¾" GH (garden hose), ¾" IP, and others. If these permutations are multiplied by the various lengths of flexhose needed, there are truly a large number of connector hoses that must be stocked.

Figure 2:
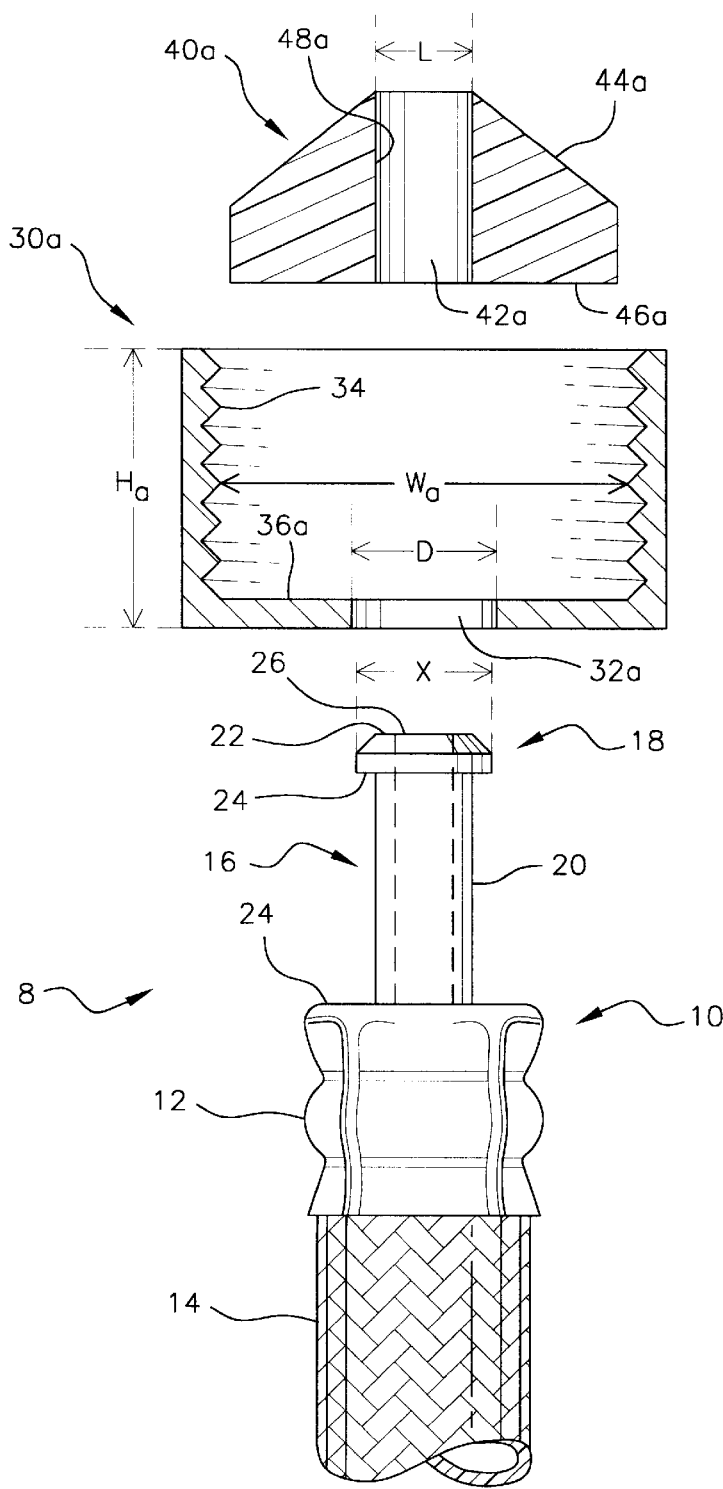
FIG. 2 is an exploded and partially exposed view showing parts of the universal conduit connector of the invention.

Turning to FIG. 2, there is shown a partially exposed and exploded view of the universal conduit connector 8 of the invention, comprising an intermediate conduit portion 10, a cup nut 30A and a washer 40A. Intermediate conduit portion 10 has a conduit end 12 permanently affixed to a hose section 14. A stem 16 extends from conduit end 12 and has a barbed tip 18 which has a larger diameter than the diameter 20 of stem 16. Barbed tip 18 has a top surface 22 and an edge 24. A through hole 26 is formed through stem which communicates with the interior of conduit end 12 and hose 14 to provide for fluid flow therethrough. Stem 16 is permanently affixed to connector 12. Conduit end 12 and stem 16 are preferably made from corrosion resistant material such as brass, stainless steel, or high impact plastics. Cup nut 30A has a height $H_a$ and internal diameter $W_a$ with an axial opening 32A formed therethrough. Axial opening 32A has a diameter D which is sized to be slightly larger than diameter X of barbed tip 18. Cup nut 30A is female threaded with threads 34A of a particular thread design and an inside bottom surface 36A of nut for sealing with washer 40A is provided. Washer 40 has a through hole 42A formed therethrough with a diameter L and wall surfaces 48A. Washer has top surface 44A and an underside surface 46A. Diameter L of through hole 42A is smaller than diameter X of barbed tip 18 and is sized to snugly engage with surface 20 of stem 16.

Figure 3:
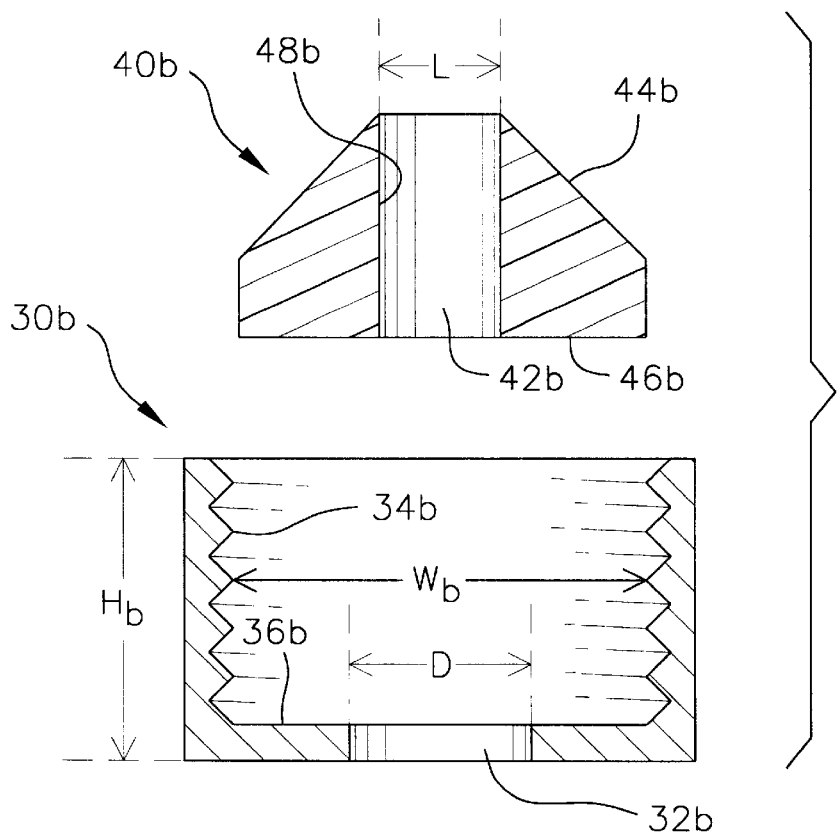
FIG. 3 is a cross-sectional view showing a first alternate sized nut and washer.

Turning to FIG. 3, there is shown an additional cup nut 30B and washer 40B. Nut 30B has a through hole 32B formed with diameter D, and a different height $H_b$, width $W_b$, and/or thread designs 34B. A bottom surface 36B is formed on nut 30B. Washer 40B has a through hole 42B having a diameter L, a top surface 44B and a bottom surface 46B with inner wall surface 48B. Internal diameter L is sized to fit snugly around stem 16.

Figure 4:
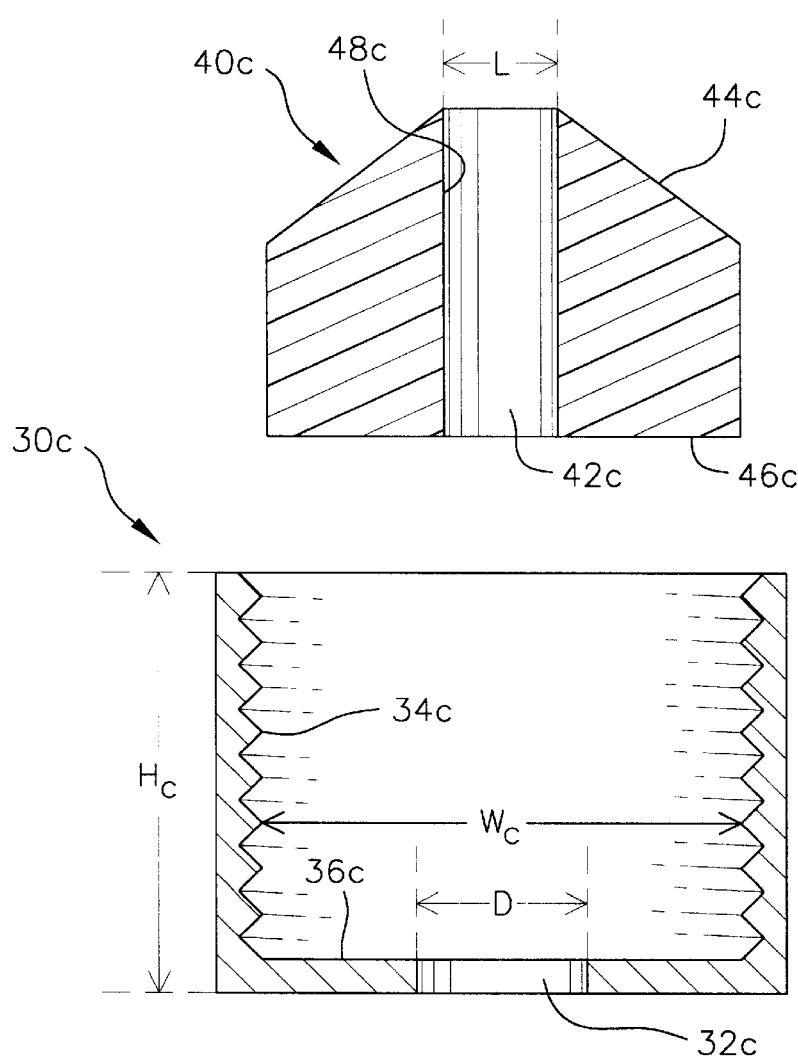
FIG. 4 is a cross-sectional view showing a second alternate sized nut and washer.

FIG. 4 is a cross-sectional view showing a cup nut 30C and washer 40C having different dimensions than that shown in FIGS. 2 and 3. Nut 30C has a height $H_c$, a width $W_c$, and aperture 32C formed therethrough with a diameter D, a thread design 34C and a base 36C. Washer 40C has an aperture with a diameter L, a top surface 44C, a bottom surface 46C and inner wall surfaces 48C of aperture 42C.

Figure 5:
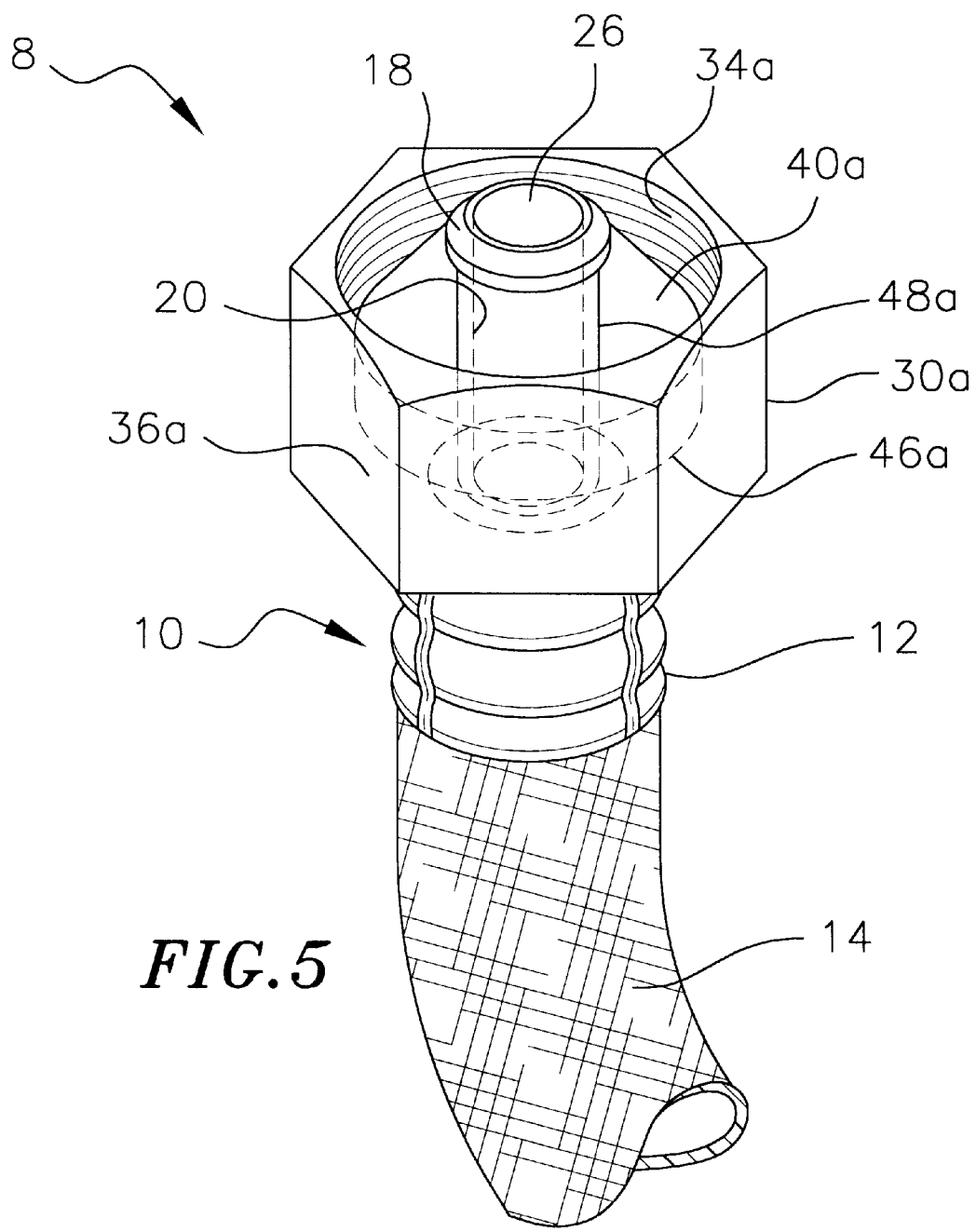
FIG. 5 is a partially exposed perspective view showing an assembled end of the universal conduit connector of FIG. 2.

FIG. 5 is a partially exposed perspective view showing an assembled universal conduit connector of the invention. Washer 40A is shown slid over barb 18 of stem 16 to engage wall surface of stem 20, and its underside 46A sealingly engages back 36A. Through hole 28 in stem is shown.

Universal conduit connector can be sold packaged with a single, predetermined nut and washer combination, can be sold in a kit form with a single length of flex hose but with multiple connector ends, or the hose and the nuts and washer sets can be sold separately.

Figure 6:
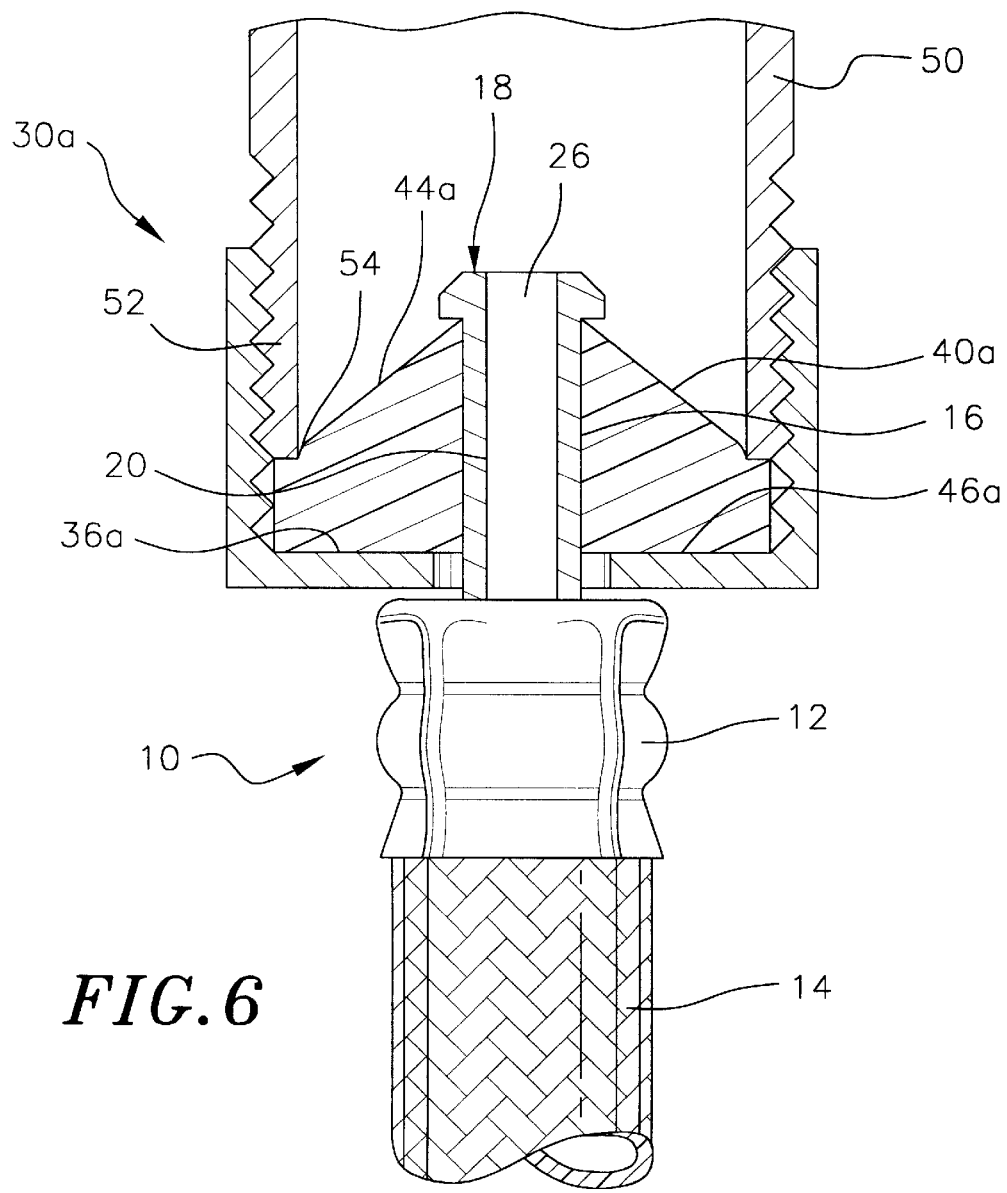
FIG. 6 is a partially exposed cross-sectional view showing the universal conduit connector of FIG. 2 engaged with a pipe nipple.

FIG. 6 is a cross-sectional view showing the assembled universal conduit connector 8 affixed to a pipe nipple 50. As shown, by screwing cup nut 30A onto threaded end 52 of pipe nipple, pipe nipple pushes on top surface 44a of washer, and washer 40A tightly engages walls 20 of stem and is prevented from being pulled off of barbed tip 18 of stem, and bottom surface 46A of washer sealingly engages with inside top surface 36A of washer, thereby providing sealing engagement and preventing hose assembly 10 from being pulled free from nut 30A, washer 40A or pipe nipple 50. It can be appreciated that prior to having a compressive force applied to washer 40A, by applying pressure to an underside of washer 46A, washer can be removed from barb 18 and stem 16, although the force required to push washer 40A down onto stem is less than the force required to remove washer from stem. A very secure engagement is produced by the arrangement of the invention which is not only watertight, but prevents universal conduit connector 8 from being pulled from a pipe, even under high pressure.

Figure 7:
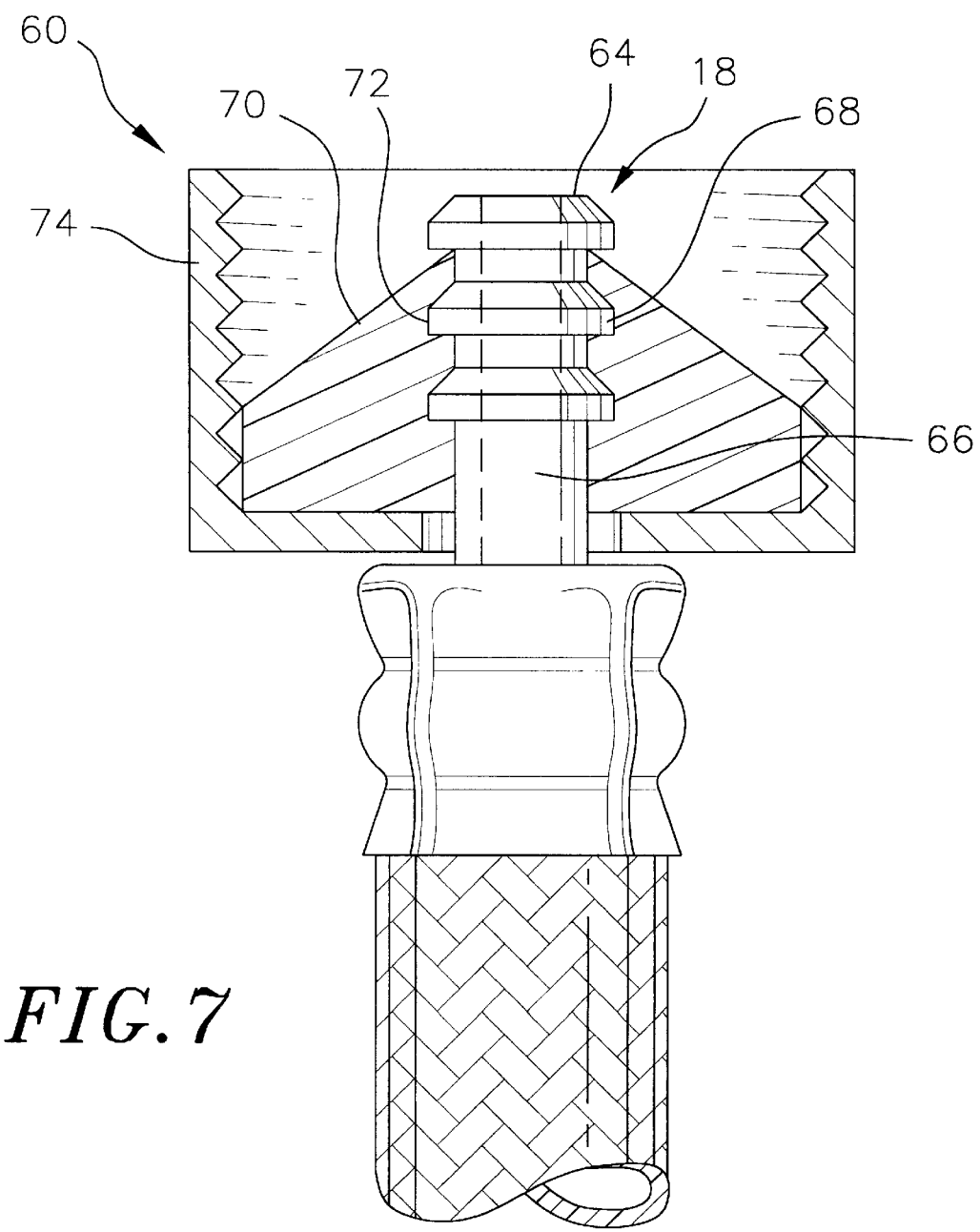
FIG. 7 is a partially exposed cross-sectional view showing a second embodiment of a connector end and washer of the invention.

Turning to FIG. 7, there is shown a second embodiment wherein stem 62, in addition to having a beveled, barbed tip 64, has barbs 68 formed on its shaft 66 and washer 70 preferably has a matching bore contour 72 to engage with barbs 68, thereby providing for a more secure engagement between washer 70 and stem 62.

Figure 8:
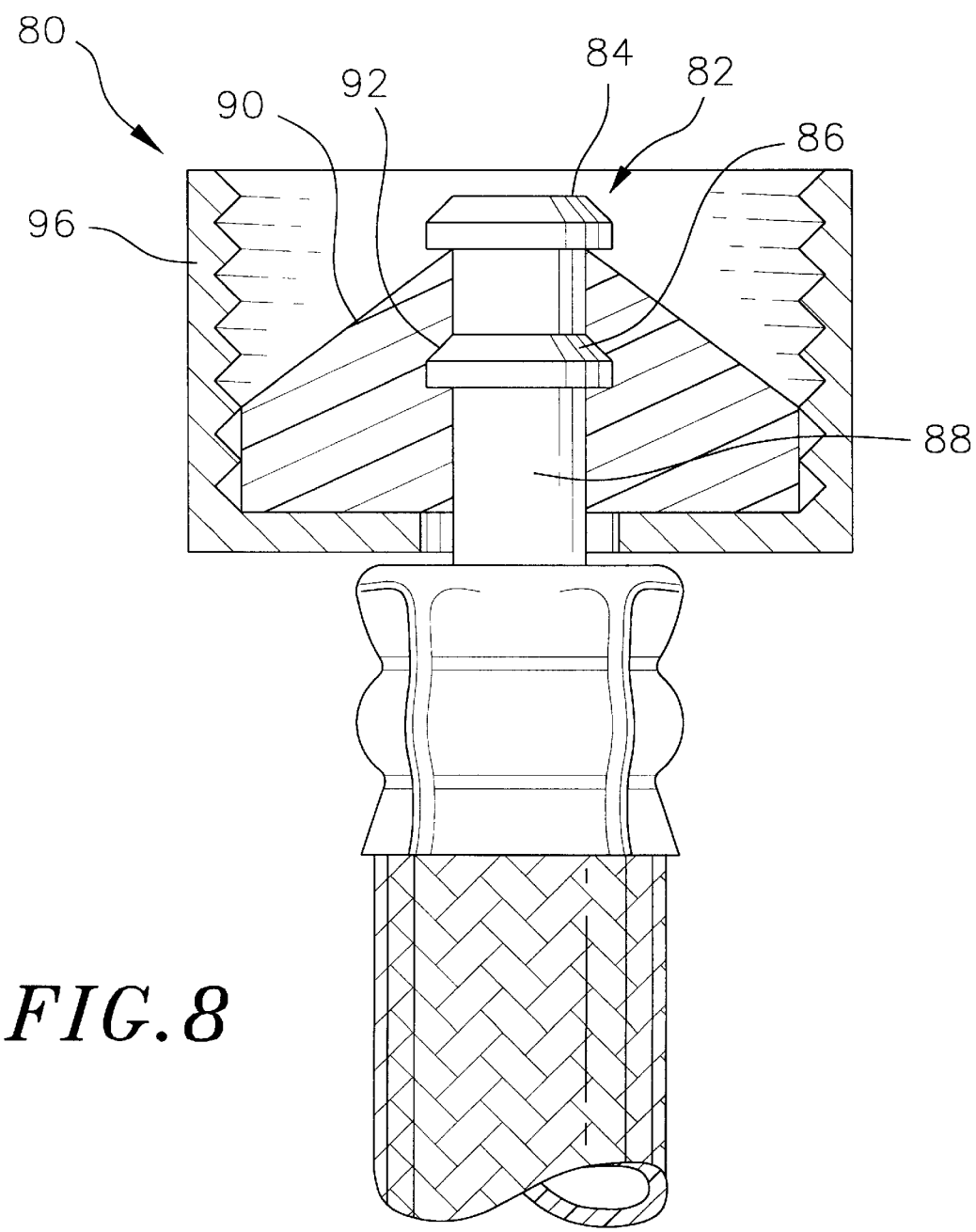
FIG. 8 is a third embodiment of a connector end and washer of the invention.

Turning to FIG. 8, there is shown a third embodiment wherein stem 82 has a barbed tip 84 and has a secondary barb 86 extending from its shaft's surface 88. Washer 90 has a relief 92 sized and positioned such that when washer 90 is forced over barbs 84 and 88, washer 90 becomes tightly engaged therewith and resists removal.

Figure 9:
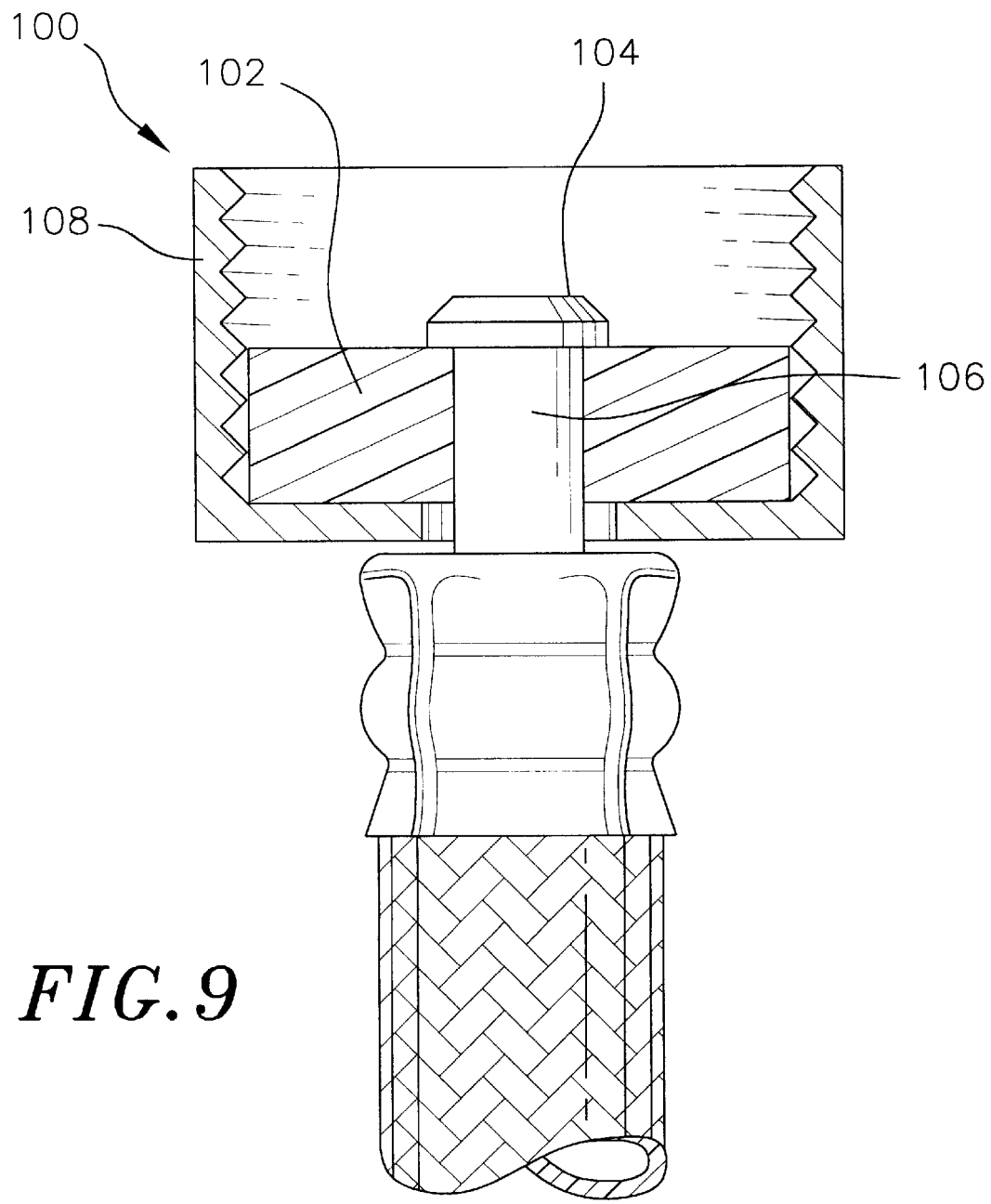
FIG. 9 is a fourth embodiment showing a flat washer of the invention.

FIG. 9 is a cross-sectional view showing a further embodiment 100 where a flat washer 102 is positioned over a barbed tip 104 and to contact with stem 106. Cup nut 108 is the same as with embodiment shown in FIGS. 1–8.

Figure 10:
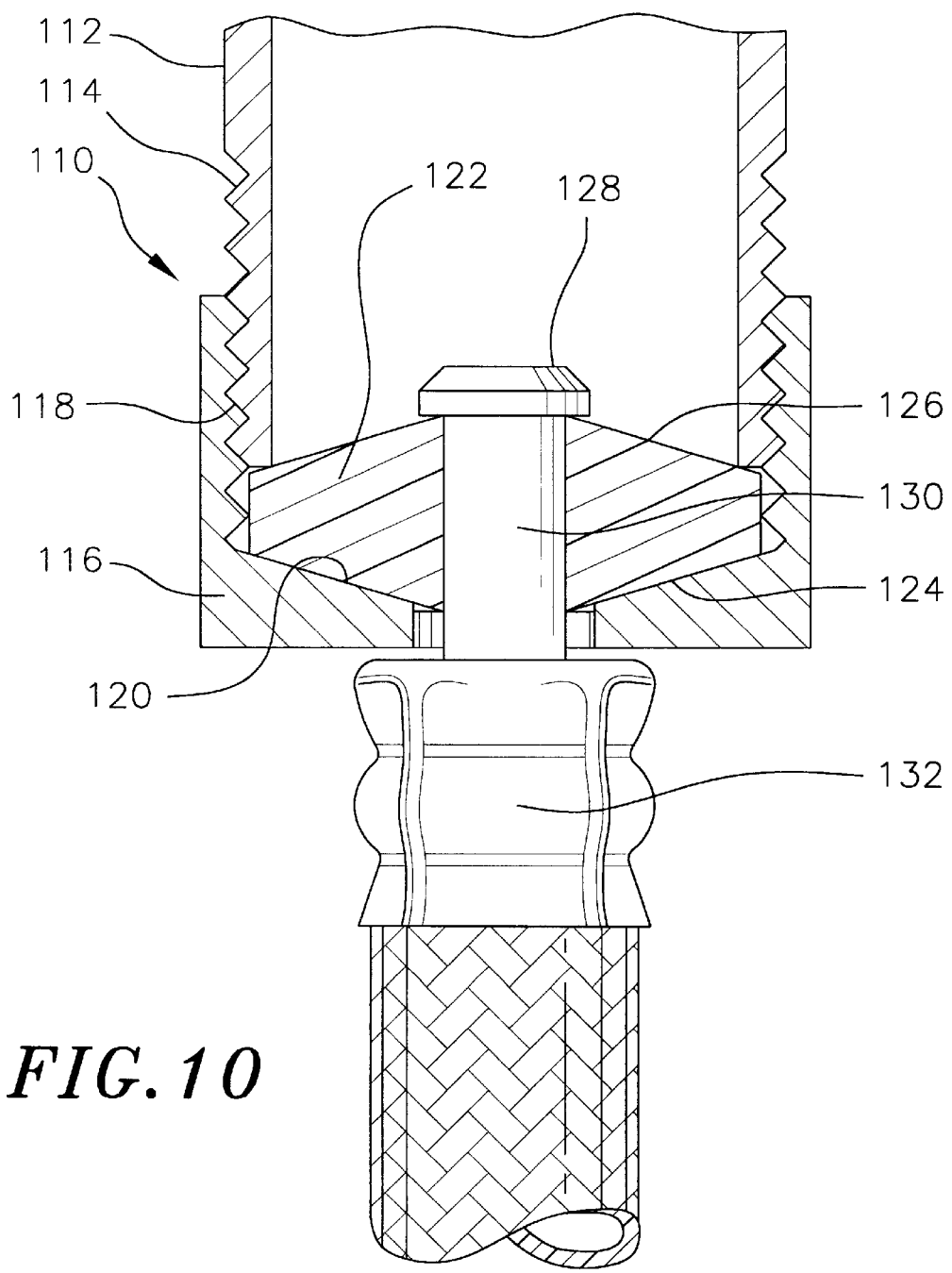
FIG. 10 is a partially exposed cross-sectional view showing a fifth embodiment of a nut and washer of the universal conduit connector of the invention screwed onto a pipe nipple.

Turning lastly to FIG. 10, there is shown a partially exposed cross-sectional view of a fifth embodiment of a universal conduit connector 110 for connection to pipe nipple 112 with threads 114 formed thereon. Cup nut 116 is female threaded 118 to engage with male threaded 114 pipe nipple and has a bottom sloped surface 120 adapted to fit a double beveled washer 122. Washer 122 is beveled on a bottom surface 124 and on a top surface 126, and washer 122 slides over a barbed tip 128 and seals around stem 130 which is connected to connector end 132.

All embodiments of the universal conduit connector of the invention permit the cup nuts to be freely rotated and screwed onto a pipe nipple without twisting the immediate portion of the conduit during attachment to pipe nipple and other connectors, until the very end of tightening.

By stocking desired lengths of tubing with connector ends affixed thereto (offered in various lengths such 27 cm, 30 cm, 41 cm, 51 cm, 61 cm and 76 cm (8", 12", 16", 20", 24" and 30")), the total number of different pieces a merchant must stock is reduced.

The washers are formed from a flexible and resilient material such as hard rubber which allows the washers to be deformed slightly when inserted onto the stem and prong tip. The nut cup is securely engaging with the intermediate conduit portion when the washer is placed on the stem.

Having thus described the exemplary embodiments of the present invention, it should be understood by those skilled in the art that the above disclosures are exemplary only and that various other alternatives, adaptations, and modifications may be made within the scope of the present invention. The presently disclosed embodiment is to be considered in all respects as illustrative and not restrictive. The scope of the invention being indicated by the appended claims rather than the foregoing description, and all changes which come within the meaning and range of equivalency of the claims are, therefore, intended to be embraced therein.

What is claimed is:

1. A universal conduit connector, comprising:
   a conduit having an intermediate portion with connector ends, at least one of the connector ends having a stem extending therefrom and having a through hole formed therethrough, the stem having an intermediate portion having a smaller diameter and a retention means with a larger diameter;
   at least one threaded nut cup having a flat base with an aperture formed therein that is sized larger than the diameter of the retention means; and
   at least one resilient washer dimensioned to fit within the at least one threaded nut cup and having a through hole sized to fit tightly around the intermediate portion of the stem, the resilient washer being adapted to be engaged with the retention means to retain the threaded nut cup with the connector ends, the washer having a beveled top surface and a generally flat bottom surface which directly seats on the flat base of the threaded nut cup.

2. The universal conduit connector of claim 1, wherein the retention means of the stem comprises a beveled barb on a tip of the stem.

3. The universal conduit connector of claim 2, wherein the beveled barb has a narrower front and a wider rear, the wider rear defining a rim with a wider diameter than the diameter of the intermediate portion of the stem.

4. The universal conduit connector of claim 2, wherein the retention means further comprises barbs on the intermediate portion of the stem, and the washer has a relief in its through hole adapted to engage with the barbs on the intermediate portion of the stem.

5. The universal conduit connector of claim 1, wherein a plurality of threaded nut cups, having different diameters and thread characteristics, and a plurality of washers adapted to fit with the plurality of threaded nut cups, are provided.

6. The universal conduit connector of claim 1, wherein the conduit is flexible hose with metallic or plastic connector ends affixed thereto.

7. A universal conduit connector, comprising:
- a flexible conduit having an intermediate portion of a predetermined length with identical connector ends affixed to ends of the flexible conduit, each connector end having a stem extending therefrom and having a through hole formed therethrough, the stems having intermediate portion having a smaller diameter and a beveled barb on a tip of the stem with a larger diameter;
- a plurality of threaded nut cup, each having a flat base with an aperture formed therein that is sized larger than the diameter of the beveled barb; and
- a plurality of resilient washers dimensioned to fit within a matched threaded nut cup and having a through hole sized to fit tightly around the intermediate portion of the stem, the resilient washer being adapted to be engaged with the beveled barb to retain the threaded nut cup with the connector ends, the washer having a beveled top surface and a generally flat bottom surface which directly seats on the flat base of the threaded nut cup.

8. The universal conduit connector of claim 7, wherein the beveled barb has a narrower front and a wider read, the wider rear defining a rim with a wider diameter than the diameter of the intermediate portion of the stem.

9. The universal conduit connector of claim 8, wherein barbs are formed on the intermediate portion of the stem, and the washer has a relief in its through hole adapted to engage with the barbs on the intermediate portion of the stem.

10. The universal conduit connector of claim 1, wherein the washer has a generally flattened rearwardly facing surface which seats on the seating surface of the threaded nut cup which is generally flattened.

11. The universal conduit connector of claim 7, wherein the washer has a generally flattened rearwardly facing surface which seats on the seating surface of the threaded nut cup which is generally flattened.

\* \* \* \* \*